US011409416B2

(12) United States Patent
Woodward et al.

(10) Patent No.: US 11,409,416 B2
(45) Date of Patent: Aug. 9, 2022

(54) CUSTOM USER INTERFACE GENERATION FOR COMPLETING A PREDICTED TASK

(71) Applicant: salesforce.com, inc., San Francisco, CA (US)

(72) Inventors: David James Woodward, Mountain View, CA (US); Brian J. Lonsdorf, Moss Beach, CA (US); Owen Winne Schoppe, Orinda, CA (US); Alan Martin Ross, San Francisco, CA (US); Jessica Lundin, Bellevue, WA (US); Sönke Rohde, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 16/941,176

(22) Filed: Jul. 28, 2020

(65) Prior Publication Data

US 2021/0240320 A1    Aug. 5, 2021

Related U.S. Application Data

(60) Provisional application No. 62/968,784, filed on Jan. 31, 2020.

(51) Int. Cl.
*G06F 3/0484* (2022.01)
*G06F 9/451* (2018.01)
(Continued)

(52) U.S. Cl.
CPC .......... *G06F 3/0484* (2013.01); *G06F 3/0481* (2013.01); *G06F 9/451* (2018.02); *G06N 5/04* (2013.01); *G06N 20/00* (2019.01)

(58) Field of Classification Search
USPC ......................................................... 715/762
See application file for complete search history.

(56) References Cited

U.S. PATENT DOCUMENTS

| 2003/0014421 | A1* | 1/2003 | Jung | G06F 16/86 |
| | | | | 707/999.102 |
| 2007/0234224 | A1* | 10/2007 | Leavitt | G06F 1/1626 |
| | | | | 715/765 |

(Continued)

OTHER PUBLICATIONS

Melanie Hartmann, "Context-Aware Intelligent User Interfaces for Supporting System Use", Dissertation of Technical University of Darmstadt, Jan. 18, 2010. (Year: 2010).*

(Continued)

*Primary Examiner* — Reza Nabi
*Assistant Examiner* — Hwei-Min Lu
(74) *Attorney, Agent, or Firm* — Sterne, Kessler, Goldstein & Fox P.L.L.C.

(57) ABSTRACT

Disclosed herein are system, method, and computer program product embodiments for generating custom user interfaces (UIs) for completing a task. One embodiment operates by obtaining contextual information associated with a user and an application on a user device operated by the user, where the application includes a plurality of UI elements. Then, determining the user is attempting to complete a first task within the application based on the contextual information and a prediction model. The embodiment further operates by obtaining a minimum set of UI elements required for the first task. Further, the embodiment operates by transmitting a first custom UI including the minimum set of UI elements for the first task to the user device for display to the user.

20 Claims, 6 Drawing Sheets

(51) Int. Cl.
    *G06F 3/0481*     (2022.01)
    *G06N 20/00*     (2019.01)
    *G06N 5/04*     (2006.01)

(56) References Cited

U.S. PATENT DOCUMENTS

| | | | |
|---|---|---|---|
| 2011/0154216 A1* | 6/2011 | Aritsuka | G06F 9/44505 |
| | | | 715/745 |
| 2013/0159228 A1* | 6/2013 | Meijer | G06F 9/451 |
| | | | 706/14 |
| 2015/0324338 A1* | 11/2015 | Levy | G06F 40/117 |
| | | | 715/244 |
| 2017/0277312 A1* | 9/2017 | Adelman | G06F 3/048 |
| 2018/0113781 A1* | 4/2018 | Kim | G06F 11/3447 |
| 2019/0347143 A1* | 11/2019 | Carteri | G06F 11/3433 |
| 2019/0355153 A1* | 11/2019 | Singh | H04N 21/816 |
| 2020/0125586 A1* | 4/2020 | Rezaeian | G06N 5/04 |
| 2021/0103447 A1* | 4/2021 | Wei | G06F 9/445 |

OTHER PUBLICATIONS

International Search Report and Written Opinion of the International Searching Authority issued in International Application No. PCTUS2021/015838, dated May 17, 2021, 13 pages.
Melanie Hartmann; "Context-Aware Intelligent User Interfaces for Supporting System Use"; Dissertations of Technical University of Darmstadt; Jan. 18, 2010 (Jan. 18, 2010); pp. 1-201, XP055281756; Retrieved from the Internet URL:http://tuprints.ulb.tu-darmstadt.de/ 21 65/1/PHD.PDF; [retrieved on Jun. 20, 2016].

* cited by examiner

CUSTOM USER INTERFACE GENERATION FOR COMPLETING A PREDICTED TASK

CROSS-REFERENCE TO RELATED APPLICATIONS

This application is a non-provisional of U.S. Provisional Patent Application Ser. No. 62/968,784, entitled: "Custom User Interface Generation for Completing a Predicted Task," which filed on Jan. 31, 2020. Accordingly, this application claims priority to U.S. Provisional Patent Application Ser. No. 62/968,784 under 35 U.S.C. § 119(e). U.S. Provisional Patent Application Ser. No. 62/968,784 is hereby incorporated by reference in its entirety.

BACKGROUND

It is not uncommon for a software application to have one or more workflows to perform one or more tasks. During each workflow, the user may be presented with a large number of user interface (UI) elements (e.g., GUI widgets) distributed across multiple screens. In order to complete a task, the user might only manipulate some of the UI elements, leaving other UI elements untouched. Moreover, different tasks may require the user to manipulate different UI elements.

The large number of UI elements may increase the time needed by the user to complete the task because the user must determine which UI elements need to be manipulated. Further, the large number of UI elements may result in errors due to the user manipulating UI elements that do not need to be manipulated to complete the task. Further still, the large number of UI elements may result in excess network bandwidth consumption because UI elements that do not need to be manipulated by the user to complete the task are still transmitted to a user's computing device. Regardless, workflows and UI elements remain a popular way for user's to complete tasks within a software application.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method, and computer program product embodiments that utilize machine learning to determine the minimum set of UI elements required to complete a task of an application. Specifically, data structures are used to record which UI elements are being manipulated by users, and then the data structures are grouped into clusters by a machine learning model. Each cluster may correspond to a task. The minimum set of UI elements required to complete the task is determined by performing a union operation on the data structures in the cluster corresponding to the task. The clusters may be ranked and the distances between pairs of clusters, representing the similarity between two tasks, may also be determined. A custom UI for the task may be generated with the minimum set of UI elements, but not the other UI elements, and transmitted to user's computing device to complete the task. As discussed throughout this disclosure, the disclosed embodiments reduce task completion time, reduce task errors, and reduce bandwidth consumption over existing systems and processes.

Also provided herein are system, method, and computer program product embodiments that determine and rank tasks that the user is trying to complete based on contextual information. A custom UI for each determined task may be generated. Each custom UI has the minimum number of UI elements required to complete the corresponding task. These custom UIs may be transmitted to a user device operated by the user. Images of one or more of the custom UIs, instead of the custom UIs themselves, may also be generated and transmitted to the user device as previews for the custom UIs.

Figure 1:
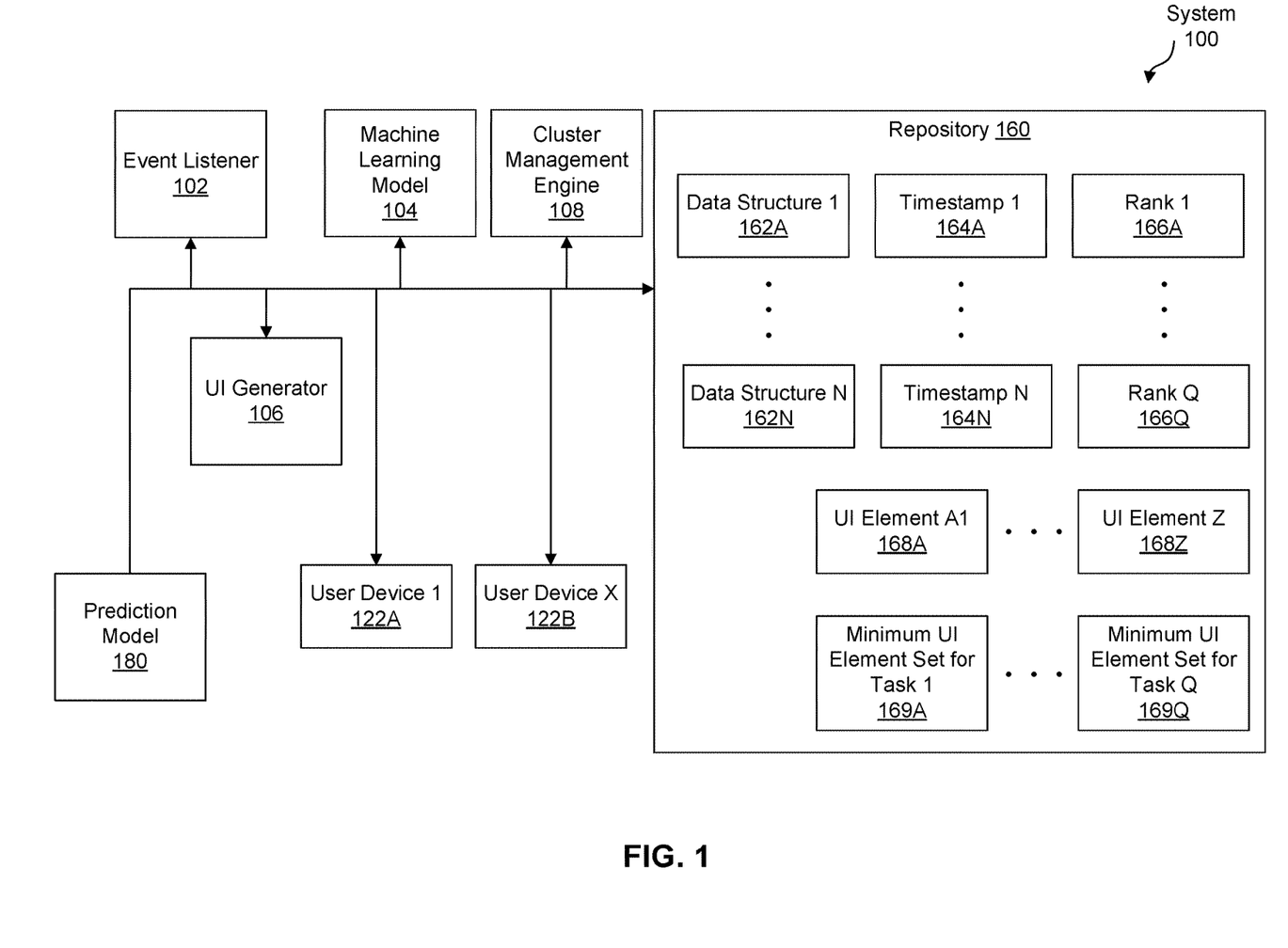
FIG. 1 shows a block diagram of a system in accordance with one or more embodiments.

FIG. 1 shows a system 100 in accordance with one or more embodiments. As shown in FIG. 1, the system 100 has multiple components including, for example, an event listener 102, a machine learning model 104, a UI generator 106, a cluster management engine 108, a prediction model 180, and a repository 160. Each of these components (102, 104, 106, 108, 160, 180) may execute on the same computing device (e.g., server, mainframe, desktop personal computer (PC), laptop, tablet PC, smartphone, etc.) or on different computing devices connected by a network having wired and/or wireless segments. These components (102, 104, 106, 108, 120, 180) may form at least part of an application (e.g., email application, customer relationship management application, social media application, image processing application, word processing application, encryption application, web browser, etc.). Moreover, a portion of the application may reside and/or execute on the computing device of a user (e.g., user device 1 122A, user device X 122B). The user devices 122 may correspond to desktop PCs, laptops, tablet PCs, smartphones, etc.

The application is associated with multiple UI elements 168 (e.g., UI element 1 168A, UI element Z 168Z). Each UI element 168 may correspond to a textbox, a set of radio buttons, a dropdown list, a slider, or any GUI widget that can be manipulated by a user. The UI elements 168 may be transmitted to user devices 122 and then displayed across multiple screens. In order to complete different tasks, users may be required to manipulate different subsets of the UI elements 168. Example tasks include updating records, configuring the options on an outgoing email, configuring user permissions, creating or editing steps in a workflow, updating a product catalog, creating new records, configuring database fields, creating or editing components inside of an application interface builder etc. Accordingly, manipulating the UI elements 168 may update fields in tables, configure the settings on an outgoing email, update a database field or schema, execute a process on another machine (aka a server), schedule a process to be excuted later etc.

In one or more embodiments, the event listener 102 is configured to track which UI elements 168 are being manipulated by a user while the user is completing a task within the application. The event listener 102 may record the identities of the manipulated UI elements in a data structure 162 (e.g., vector, linked list, array, etc.). Additionally or alternatively, the manipulated UI elements themselves could be instrumented to update the data structure 162. For example, data structure 1 162A may include the identities of the UI elements manipulated while a user was completing a task. Another data structure (not shown) may include the identities of the UI elements manipulated while a different user was completing the same task. Data structure N 162N may include the identities of the UI elements manipulated while the same user or a different user was completing a different task. The identities of the UI elements in a data structure may be sorted based on the order in which the UI elements appears in the workflow. For example, in the case of a multi-screen workflow, the identity of a UI element that appeared on the first screen would come before the identity of a UI element that appeared on the last screen. Similarly, the identity of a UI element that appeared on a top of a screen would come before the identity of a UI element that appeared on the bottom of the same screen. Additionally or alternatively, the order in which the manipulated UI elements appeared in the workflow may be stored in the data structure 162 separately from the identities of the manipulated UI elements. Additionally or alternatively, the order in which the user manipulated the UI elements may be stored in the data structure. The identity of a UI element may appear more than once in a data structure 162 if the user manipulated the UI element multiple times to complete the task. In one or more embodiments, the identity of the screen on which the manipulated UI element appeared (e.g., screen 3 of the 5 screen workflow) is also stored in the data structure.

In one or more embodiments, the event listener 102 stores a timestamp 164 associated with each data structure 162. The timestamp 164 reflects the time (e.g., year, month, day, hour, minute, second, etc.) when the task associated with the data structure 162 was completed. For example, timestamp 1 164A reflects the time when the task associated with data structure 1 162A was completed. Similarly, timestamp N 164N reflects the time when the task associated with the data structure N 162N was completed.

In one or more embodiments, the machine learning model 104 is configured to group the data structures 162 into clusters based on the UI elements identified in each of the data structures 162. The machine learning model 104 may utilize any type of clustering algorithm (e.g., centroid-based clustering, density-based clustering, hierarchical clustering, distribution-based clustering, etc.) to group the data structures 162. Each of the clusters may correspond to one of the tasks.

In one or more embodiments, the cluster management engine 108 is configured to calculate age statistics for the clusters. For example, the age statistic of a cluster may correspond to the average age of the data structures in the cluster, as determined from the timestamps 164. As another example, the age statistic of a cluster may correspond to the age of the youngest data structure in the cluster or the standard deviation of the ages of the data structures in the cluster, as determined from the timestamps 164.

In one or more embodiments, the cluster management engine 108 is configured to calculate distances between pairs of clusters. For example, the distance between two clusters may be the distance from the center of one cluster to the center of the other cluster. A small distance is indicative of the two tasks corresponding to the two clusters being similar. Similarly, a large distance is indicative of the two tasks corresponding to the two clusters being unrelated. These distances (not shown) may also be stored in the repository 160. The closest cluster (i.e., the cluster that is the shortest distance away) may be referred to as the nearest neighbor.

In one or more embodiments, the prediction model 180 is configured to determine one or more tasks in the application that the user is attempting to complete. The prediction model 180 may implement machine learning to determine one or more tasks in the application that the user is attempting to complete. The prediction model 180 may determine the one or more tasks based on contextual information associated with the application and the user. For example, contextual information may include the time, day, week, quarter, beginning/end of quarter when the user is accessing the application. As another example, contextual information may include the objects (e.g., tables, variables, files, etc.) the user most recently interacted with, objects created by the user that have changed since the user's last use of the application, objects with timestamps that are close to the current time/date. As another example, contextual information may include recent search queries requested by the user. As another example, contextual information may include the device the user is using (a Desktop PC, smartphone, tablet, etc.), the available bandwidth of their network connection (e.g. a 3G cellular connection, or a Gigabit fiber connection), or their geography either absolute, or relative to the computing device sending the UI. As yet another example, contextual information may include other users who have employment positions or titles similar to the position/title of the user, other users who the user follows (e.g., on social media), etc.

In one or more embodiments, the prediction model 180 is configured to rank the one or more determined tasks. The task with the highest rank corresponds to the task the user is most likely attempting to complete according to the prediction model 180. The remaining determined tasks have lower rankings (i.e., the user is less likely to be attempting to complete the remaining tasks, according to the prediction model 180). As discussed above, each task may correspond to a cluster. The rank of a task may be based on the cardinality of the corresponding cluster (i.e., number of data structures 162 in the cluster) relative to the cardinality of the other clusters (corresponding to other tasks). For example, the more data structures in a cluster, the higher the ranking of the corresponding task. Additionally or alternatively, the rank of a task may depend on an age statistic of the task's cluster relative to the age statistics of the other clusters (corresponding to other tasks). A task corresponding to a cluster with young data structures may be ranked higher than a task corresponding to a cluster with older data structures.

As discussed above, each task may correspond to a cluster and distances between clusters may be calculated. In one or more embodiments, at least some of the rankings may also be based on these distances. For example, assume cluster A, cluster B, and cluster C correspond to task A, task B, and task C, respectively. Moreover, assume the distance between cluster A and cluster C is shorter than the distance between cluster A and cluster B. If it is determined, based on contextual information, that the user is most likely attempting to complete task A, task A will have the highest rank. Task C will be assigned the next highest rank because cluster C is the nearest neighbor of cluster A corresponding to task A. Task B will be assigned a rank that is lower than the rank of task C because cluster B is further away from cluster A than cluster C. Although only three tasks/clusters are mentioned, this ranking scheme based on distance may be used for any number of tasks/clusters.

The rankings 166 associated with the tasks may also be stored in the repository 160. For example, ranking 1 166A and ranking Q 166Q correspond to the rankings of task 1 and task Q (not shown), respectively.

In one or more embodiments, the UI generator 106 is configured to determine the minimum set of UI elements required for a task based on the cluster corresponding to the task. Specifically, the UI generator may perform a union operation on all the UI elements identified in all data structures of the cluster. The result of this union operation is the minimum set of UI elements required for the task corresponding to the cluster. For example, minimum set of UI elements 1 169A and minimum set of UI elements Q 169Q correspond to the minimum set of UI elements for task 1 and the minimum set of UI elements for task Q, respectively. The union operation may preserve the sorting of the identities of the UI elements (discussed below). Accordingly, UI elements in a minimum set are ordered as the UI elements would have been in the original multi-screen workflow (i.e., a UI element on the first screen comes before a UI element on the last screen, a UI element on the top of the screen comes before a UI element on the bottom of the screen, etc.).

Those skilled in the art having the benefit of this disclosure will appreciate that during the union operation two data structures might have conflicting ordering information for the UI elements. In such embodiments, the newer data structure, as determined from the timestamps, controls the ordering. For example, if there are two UI elements in the union from two different data structures that have the same visual/interactive order, then the UI element from the newer data structure would be "above" or "before" the UI element from the older data structure. All subsequent UI element orderings may be adjusted accordingly.

In one or more embodiments, the UI generator 106 is configured to generate a custom UI for a task (e.g., the task with the highest ranking as determined by the prediction model 180) based on the minimum set of UI elements 169 required to complete the task. The custom UI includes the minimum set of UI elements for the task, but may exclude all the other UI elements 168 associated with the application. Unlike the multi-screen workflow, the custom UI may be a single screen. The minimum set of UI elements may be positioned in the custom UI based on the ordering of the UI elements in the minimum set. As discussed above, this is consistent with the order in which the UI elements appeared in the original multi-screen workflow. In one or more embodiments, since the custom UI only includes the minimum set of UI elements (and not all the UI elements 168 associated with the application), the custom UI can fit on a single screen. The UI generator 106 may transmit the custom UI to a user device operated by a user so that the user may complete the task.

As discussed above, the identity of the screen on which the manipulated UI element appeared (e.g., screen 3 of the 5 screen workflow) may also be stored in the data structure. In one or more embodiments, in the event the custom UI does not fit on a single screen, the identity of the screens, as recorded in the data structures, may be used as an additional heuristic to consolidate the minimal set of elements onto a minimal set of screens. The minimal set of screens would still be fewer screens than the original workflow.

In one or more embodiments, the UI generator 106 is configured to generate an image of a custom UI for a task. The image may have a low resolution in order to reduce the storage space needed to store the image and/or reduce the network bandwidth needed to transmit the image (e.g., to user devices 122). However, the resolution must be high enough to allow for the perception of the gestalt of the task (e.g., the resolution might need to be sufficiently high for the viewer (e.g., user) to be able to identify one or more of the UI elements present in the custom UI).

In one or more embodiments, the UI generator 106 is configured to generate options for display with the custom UI. These options may correspond to images of other custom UIs. These options are selectable by the user. For example, the user selection of an option triggers the corresponding image of another custom UI to be displayed (discussed below).

Figure 2:
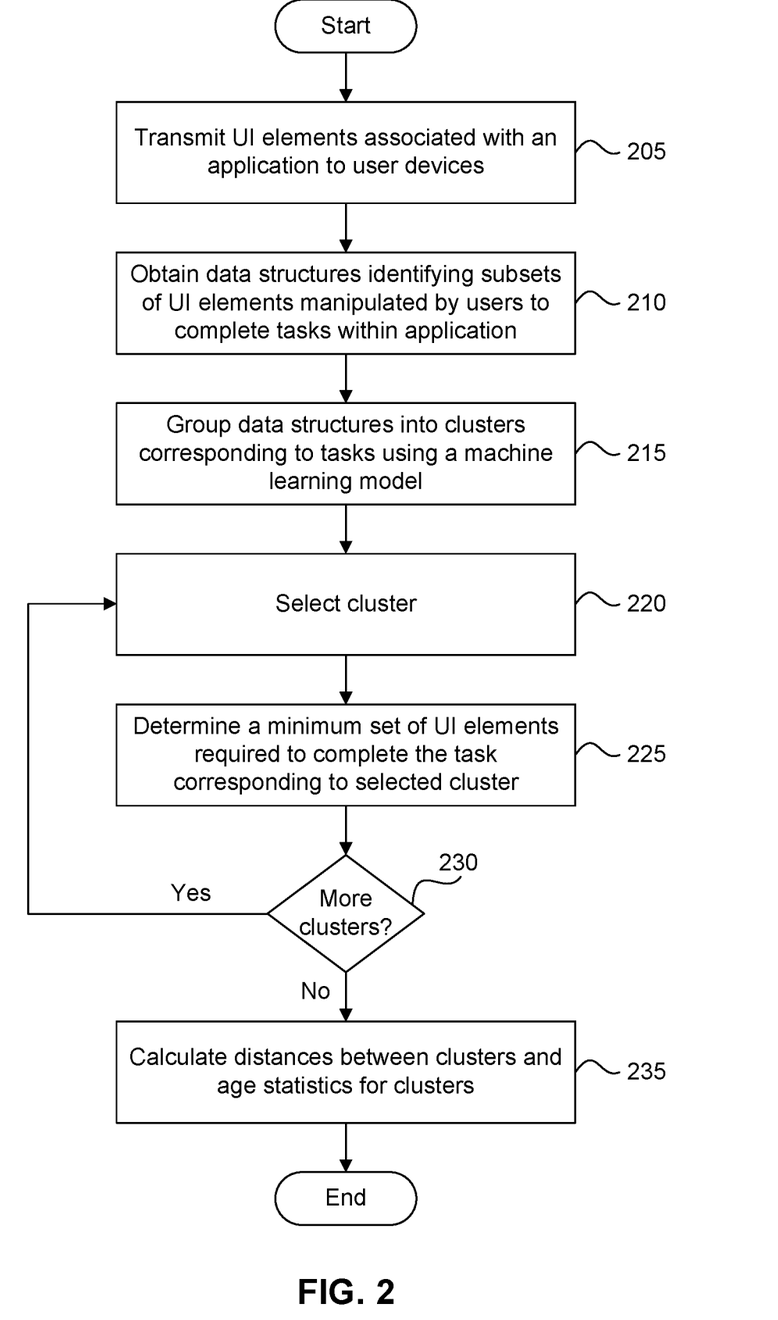
FIG. 2 shows a flowchart for determining a minimum set of UI elements required to complete a task in accordance with one or more embodiments.

FIG. 2 shows a flowchart in accordance with one or more embodiments. The flowchart of FIG. 2 depicts a process for determining the minimum set of UI elements required to complete a task. One or more of the steps in FIG. 2 may be performed by the components (102, 104, 106, 108) discussed above in reference to FIG. 1. In one or more embodiments, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

In Step 205, the UI elements associated with an application are transmitted to user devices and displayed across multiple screens as part of a multi-screen workflow. Each UI element may correspond to a textbox, a set of radio buttons, a dropdown list, a slider, or any GUI widget that can be manipulated by a user. In order to complete different tasks in the application, users operating the user devices may be required to manipulate different subsets of the UI elements. However, depending on the task in the application a user is completing, some of the UI elements will not be touched by the user. Accordingly, different subsets of the UI elements are manipulated by users to complete different tasks.

In Step 210, data structures are obtained. Each data structure may be a vector, an array, a linked-list, etc. Each data structure identifies the subset of the UI elements that were manipulated by a user to complete a task of the application. While the user is completing the task, the user's actions may be monitored (e.g., tracked) to determine which UI elements are being manipulated and which UI elements are not being touched by the user. In one or more embodiments, for privacy reasons, only the user's manipulations of the UI elements (e.g., not keystrokes) would be monitored. The identities of the modified UI elements may be stored in the data structures. Different data structures may correspond to different completed tasks and/or to different users. The identities of the UI elements in a data structure may be sorted based on the order in which the UI elements appear in the multi-screen workflow (i.e., the identity of a UI element on the first screen comes before the identity of a UI element on the last screen, the identity of a UI element on the top of the screen comes before the identity of a UI element on the bottom of the screen, etc.). A timestamp may be associated with each data structure. The timestamp may reflect the time when the task corresponding to the data structure was completed. A timestamp may be generated and stored for each interaction with a UI element as well.

Those skilled in the art, having the benefit of this disclosure, will appreciate that it is possible for different users completing the same task to manipulate slightly different subsets of UI elements. Accordingly, multiple data structures corresponding to the same task may identify slightly different subsets of the UI elements. These variations in the manipulated UI elements result from some UI elements being optional to complete a task.

In Step 215, the data structures are grouped into clusters using a machine learning model. For example, the data structures may be grouped using centroid-based clustering, density-based clustering, hierarchical clustering, distribution-based clustering, etc. Clustering effectively identifies, based on the manipulated UI elements identified in the data structures, which data structures correspond to the same task. As discussed above, the data structures corresponding to the same task may identify slightly different subsets of UI elements due to the manipulation of some UI elements being optional.

In Step 220, a cluster of data structures is selected. The cluster is selected from clusters that have not yet been selected. For example, the cluster may be selected at random. As another example, the cluster with the greatest cardinality (i.e., the greatest number of data structures) may be selected. As yet another example, the cluster with the smallest cardinality may be selected. As discussed above, each cluster corresponds to a task.

In Step 225, the minimum set of UI elements required to complete the task corresponding to the selected cluster is determined. In one or more embodiments, determining the minimum set of UI elements includes executing a union operation on the subsets of UI elements identified in all the data structures in the selected cluster. The result of this union operation is the minimum set of UI elements required to complete the task corresponding to the selected cluster. The union operation may preserve the sorting of the identities of the UI elements (discussed below). Accordingly, UI elements in a minimum set are ordered as the UI elements would have been in the original multi-screen workflow (i.e., a UI element on the first screen comes before a UI element on the last screen, a UI element on the top of the screen comes before a UI element on the bottom of the screen, etc.).

In Step 230, it is determined if there remains one or more clusters that have not yet been selected. When it is determined that at least one unselected cluster remains, the process returns to Step 220. When it is determined that all of the clusters have been selected, and thus the minimum sets of UI elements required to complete all the tasks corresponding to the clusters have been determined, the process proceeds to Step 235.

In Step 235, distances between pairs of clusters are determined. For example, the distance between two clusters may be the distance from the center of one cluster to the center of the other cluster. A small distance is indicative of the two tasks corresponding to the two clusters being similar. Similarly, a large distance is indicative of the two tasks corresponding to the two cluster being unrelated. Step 235 may be optional.

Still referring to Step 235, the age statistics of the clusters are determined. For example, the age statistic of a cluster may correspond to the average age of the data structures in the cluster, as determined from the timestamps. As another example, the age statistic of a cluster may correspond to the age of the youngest data structure in the cluster or the standard deviation of the ages of the data structure in the cluster, as determined from the timestamps.

Following Step 235, a custom UI may be generated to complete a task in the application. The custom UI includes the minimum UI elements required to complete the task, as determined in Step 225, but excludes the other UI elements associated with the application. The minimum set of UI elements may be positioned in the custom UI based on the ordering of the UI elements in the minimum set. As discussed above, this ordering is consistent with the order in which the UI elements appeared in the original multi-screen workflow. The custom UI may be transmitted to a user device for display so that the user operating the user device may manipulated the UI elements and complete the task.

Those skilled in the art, having the benefit of this detailed description, will appreciate that because the custom UI only has the minimum set of UI elements required to complete the task, and not all the UI elements, less network bandwidth is required to transmit the custom UI to the user devices. Further, because custom UI only has the minimum set of UI elements, the user wastes less time determining which UI elements need to be manipulated and thus the task can be completed more quickly. Further still, because the custom UI only has the minimum set of UI elements, there is likely to be fewer errors in completing the task because the user is not manipulating UI elements that should not be touched to complete the task.

Figure 3:
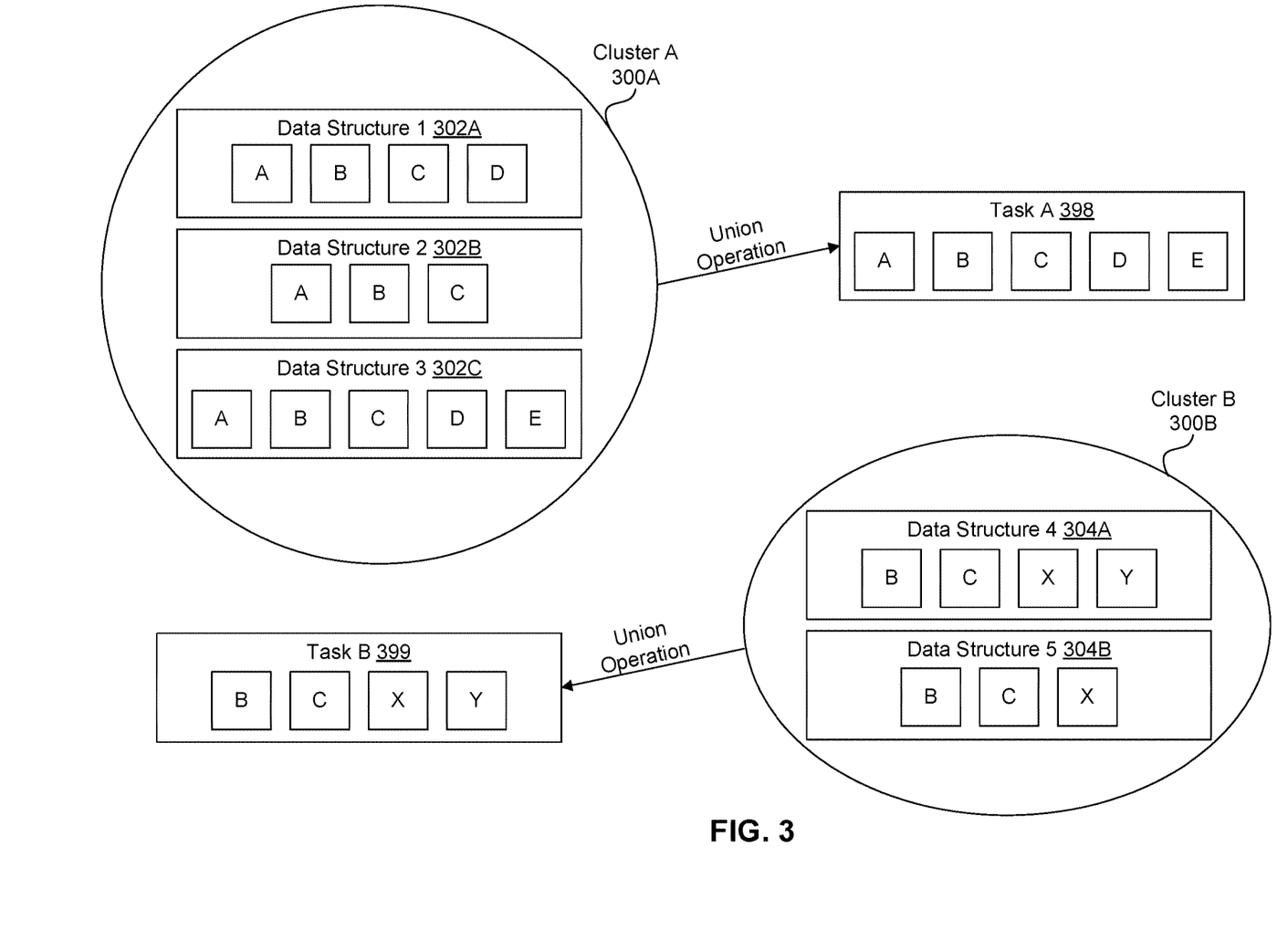
FIG. 3 shows an example of determining a minimum set of UI elements required to complete a task in accordance with one or more embodiments.

FIG. 3 shows an example in accordance with one or more embodiments.

Specifically, FIG. 3 shows an example of the process depicted in FIG. 2. As shown in FIG. 3, there are multiple data structures: data structure 1 302A, data structure 2 302B, data structure 3 302C, data structure 4 304A, and data structure 5 304B. Each of these data structures corresponds to a task. Moreover, each of these data structures includes the identities of UI elements that were manipulated to complete a task. For example, data structure 2 302B includes the identities of UI elements A, B, and C. UI elements A, B, and C were manipulated by a user to complete a task in the application. As another example, data structure 5 304B includes the identities of UI elements B, C, and X 304B. UI elements B, C, and X were manipulated by the same or a different user to complete a task in the application. If data structure 2 302B and data structure 5 304B correspond to the same user, these two data structures might be from two different sessions and thus have different timestamps. If these two data structures correspond to two different users, these two data structures might have the same timestamps (i.e., the two users completed their respective tasks at the same time) or different timestamps.

The data structures have been grouped into either cluster A 300A or cluster B 300B using a machine learning model. As shown, data structure 1 302A, data structure 2 302B, and data structure 3 302C belong to cluster A 300A, while data structure 4 304A and data structure 5 304B belong to cluster B 300B. Data structures belonging to the same cluster are deemed to correspond to the same task.

Assume cluster A 300A corresponds to task A 398 in the application. In order to determine the minimum set of UI elements required for task A 398, a union operation is performed on all the data structures 302 in cluster A 300A. The result of the union operation, and thus the minimum set of UI elements required to complete task A 398, is UI elements A, B, C, D, and E (as shown in FIG. 3). In order to complete task A 398, a custom UI with UI elements A, B, C, D, and E may be generated and transmitted to a user device. The user operating the user device may manipulate UI elements A, B, C, D, and E to complete task A 398.

Assume cluster B 300B corresponds to task B 399 in the application. In order to determine the minimum set of UI elements required for task B 399, a union operation is performed on all the data structures 304 in cluster B 300B. The result of the union operation, and thus the minimum set of UI elements required to complete task B 399, is UI elements B, C, X, and Y (as shown in FIG. 3). In order to complete task B 399, a custom UI with UI elements B, C, X, and Y may be generated and transmitted to a user device. The user operating the user device may manipulate UI elements B, C, X, and Y to complete task B 399.

Figure 4:
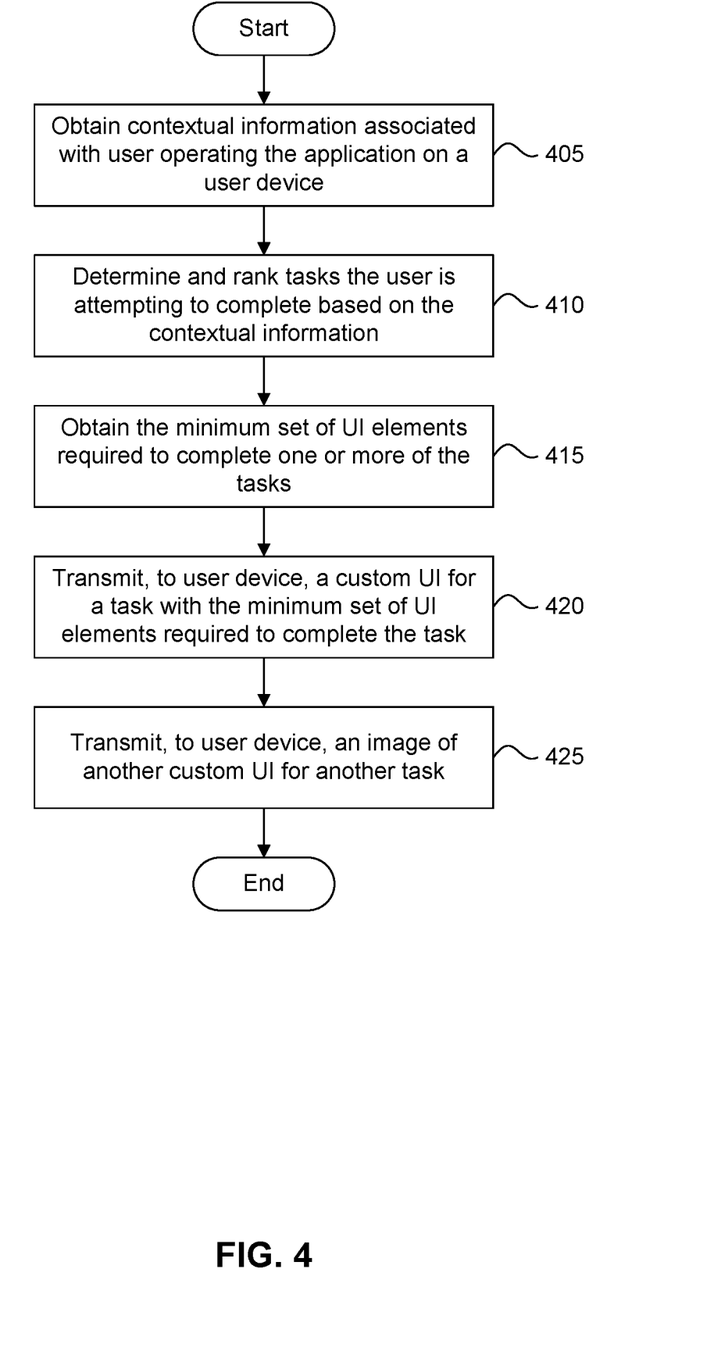
FIG. 4 shows a flowchart for generating a custom UI for completing a predicted task in accordance with one or more embodiments.

FIG. 4 shows a flowchart in accordance with one or more embodiments. The flowchart of FIG. 4 depicts a process for generating a custom UI for completing a predicted task. One or more of the steps in FIG. 4 may be performed by the components (102, 104, 106, 108, 180) discussed above in reference to FIG. 1. One or more of the steps in FIG. 4 may be performed after the steps in FIG. 2. In one or more embodiments, one or more of the steps shown in FIG. 4 may be omitted, repeated, and/or performed in a different order than the order shown in FIG. 4. Accordingly, the scope of the invention should not be considered limited to the specific arrangement of steps shown in FIG. 4.

In Step 405, contextual information associated with a user operating the application on a user device is obtained. For example, contextual information may include the time, day, week, quarter, beginning/end of quarter when the user is accessing the application. As another example, contextual information may include the objects (e.g., tables, variables, files, etc.) the user most recently interacted with, objects created by the user that have changed since the user's last use of the application, objects with timestamps that are close to the current time/date. As another example, contextual information may include recent search queries requested by the user. As yet another example, contextual information may include other users who have employment positions or titles similar to the position/title of the user, other users who the user follows (e.g., on social media), etc.

In Step 410, one or more tasks the user is attempting to complete are determined based on the contextual information. These tasks are essentially predictions executed by a prediction model based on the contextual information. The tasks may also be ranked. The task with the highest rank corresponds to the task the user is most likely attempting to complete according to the prediction model. The remaining determined tasks have lower rankings (i.e., the user is less likely to be attempting to complete the remaining tasks, according to the prediction model).

As discussed above, each task may correspond to a cluster. As also discussed above, the cardinality of each cluster, an age statistic for each cluster, and distances between clusters may be calculated. The ranking of a task may depend on the cardinality of the corresponding cluster, the age statistic for the corresponding cluster, and/or the distances between the corresponding cluster and other clusters (corresponding to other tasks).

In Step 415, the minimum set of UI elements required to complete one or more of the tasks may be obtained. For example, the minimum set of UI elements required to complete the highest ranked task is obtained, the minimum set of UI elements required to complete second highest ranked task is obtained, etc. The minimum set of UI elements for a task may have been previously determined using the process depicted in FIG. 2.

In Step 420, a custom UI for the highest ranked task is generated. The custom UI includes the minimum set of UI elements required to complete the task, but excludes the other UI elements of the application. The minimum set of UI elements may be positioned in the custom UI based on the ordering of the UI elements in the minimum set (discussed above). This custom UI may be transmitted to the user device.

In Step 425, a custom UI for the second highest ranked tasked is generated. The custom UI includes the minimum set of UI elements required to complete the second highest ranked task, but excludes the other UI elements of the application. An image of the custom UI may be generated. The image may have a low resolution in order to reduce the space needed to store the image and/or reduce the network bandwidth needed to transmit the image. However, the image may have a sufficiently high resolution in order for the viewer (e.g., user) to be able to identify the UI elements present in the custom UI. The image of the custom UI may be transmitted to the user device for display to a user.

Step 425 may be repeated for the task with the third highest rank, the task with the fourth highest rank, etc. up to some cutoff.

In one or more embodiments, while the custom UI associated with the highest ranked task is displayed to the user on the user device, one or more options may also be displayed to the user on the user device. Each option may correspond to a task other than the task with the highest rank. For example, the first option may correspond to the task with the second highest rank. The second option may correspond to the task with the third highest rank. If the user selects the second option, the image of the custom UI for the task with the third highest rank may be displayed. The image may be displayed with (e.g., on top of) or separately from the custom UI associated with the highest rank task.

Those skilled in the art, having the benefit of this detailed description, will appreciate that the highest ranked task might not be the task the user is attempting to complete. In other words, the prediction model's prediction was incorrect. By presenting these options, the user can effectively preview other custom UIs and select the correct custom UI (i.e., the custom UI corresponding to the task that the user is actually trying to complete). The custom UI corresponding to the correct task, as selected by the user, can then be requested (e.g. from the UI generator), generated, and/or displayed to the user in order to complete the task. The selection by the user may also be used as feedback to update the prediction model.

Those skilled in the art, having the benefits of this detailed description, will also appreciate that by initially transmitting the images instead of the actual custom UIs, less network bandwidth is required (as opposed to transmitting the custom UIs for all the tasks).

In one or more embodiments, a prompt may be displayed to the user on the user device requesting confirmation that the task with the highest rank is indeed the task the user is attempting to complete. The prompt might be displayed to all users. Alternatively, the prompt might only be displayed to expert users. The prompt may be optional. The response to the prompt, positive or negative, may be used as feedback to improve prediction model.

Figure 5:
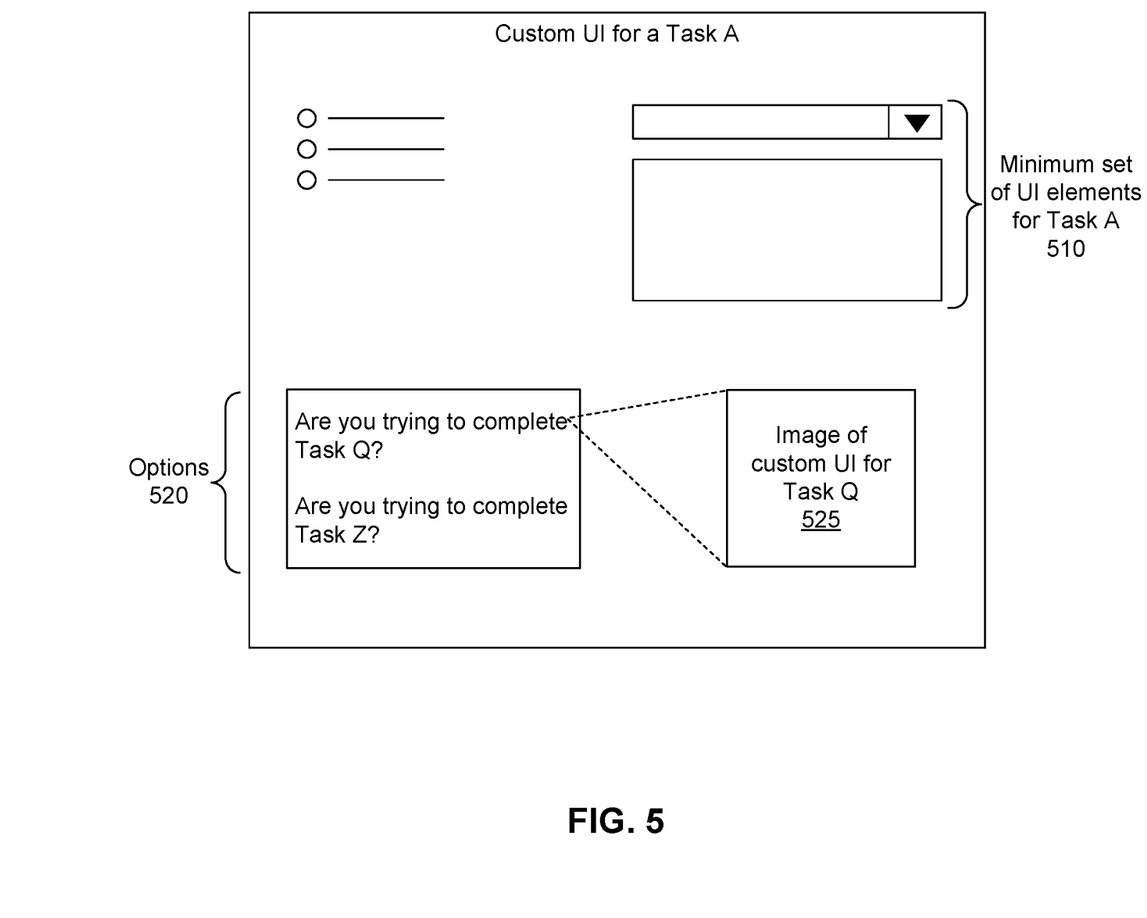
FIG. 5 shows an example of a custom UI for completing a task along with a preview image of another custom UI for completing a different task in accordance with one or more embodiments.

FIG. 5 shows an example of a custom UI for completing a task along with an image of another custom UI for completing a different task in accordance with one or more embodiments. In FIG. 5, it is assumed that task A had the highest rank. In other words, it was predicted that the user operating the user device is attempting to complete task A. As shown in FIG. 5, the custom UI for task A includes the minimum set of UI elements 510 required to complete task A. The custom UI for task A may have been generated by the UI generator 106 and transmitted to the user device (discussed above in reference to FIG. 4).

FIG. 5 also shows two options 520. The options 520 are displayed on top of the custom UI for task A. One option asks if the user is trying to complete task Q. Task Q might have had the second highest rank. The other option asks if the user is trying to complete task Z. Task Z might have the third highest rank. By selecting the first option, the image of the custom UI for task Q 525 is displayed. This image 525 may have been generated by the UI generator 106 and transmitted to the user device (discussed above in reference to FIG. 4).

In the event the user is not actually trying to complete task A (i.e., the prediction model was incorrect), the user is able to preview other custom UIs (e.g., for task Q and task Z) and select the custom UI for the task the user is actually trying to complete. The user may manipulate the UI elements on the custom UI in order to complete the task the user is actually trying to complete.

Figure 6:
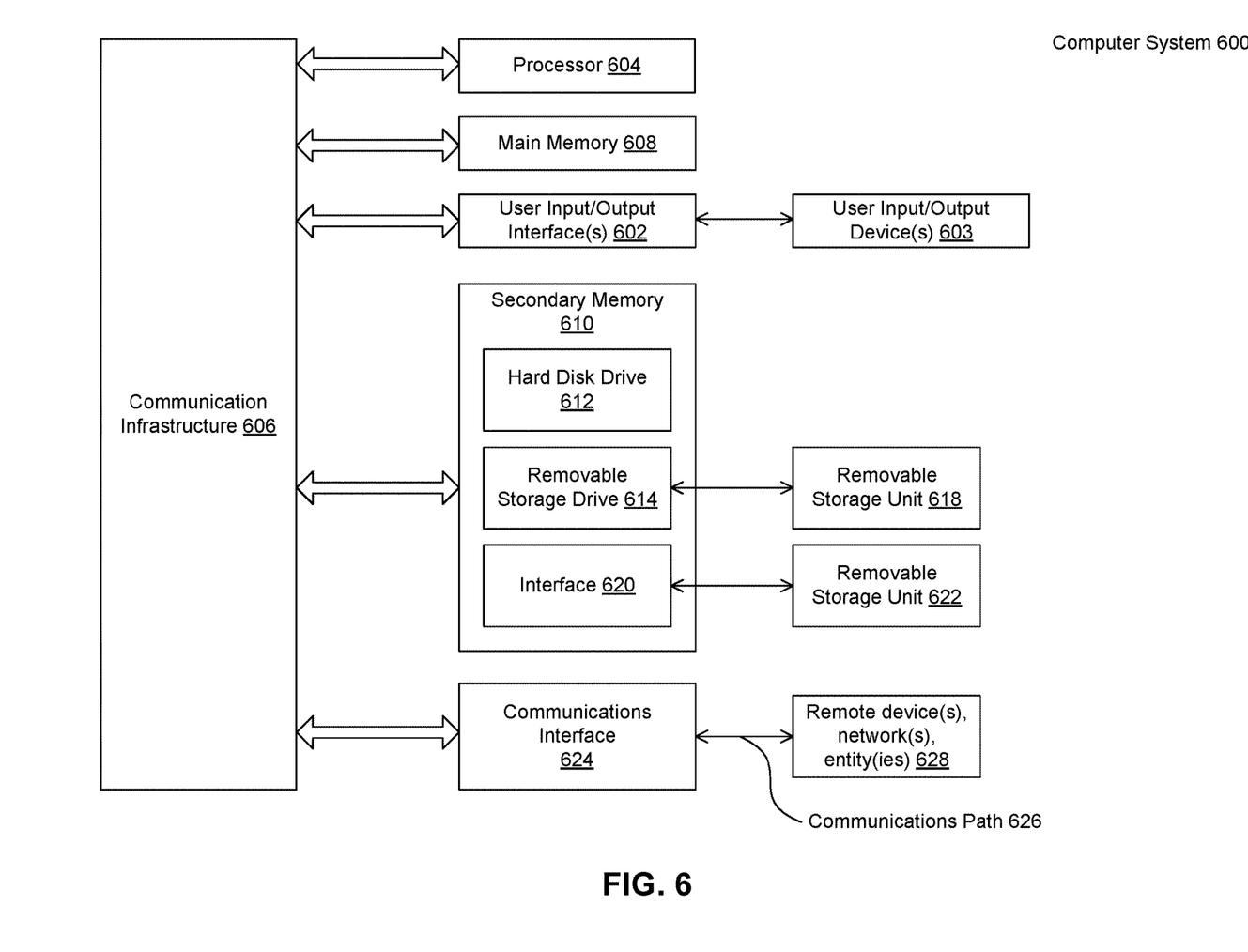
FIG. 6 is an example computer system useful for implementing various embodiments.

Various embodiments can be implemented, for example, using one or more computer systems, such as computer system 600 shown in FIG. 6. Computer system 600 can be used, for example, to implement the processes shown in FIG. 2 and FIG. 4. For example, computer system 600 can be configured to determine a minimum set of UI elements required to complete a task. Computer system 600 can also be configured to generate a custom UI for completing a predicted task. Computer system 600 can be any computer capable of performing the functions described herein.

Computer system 600 can be any well-known computer capable of performing the functions described herein.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc. One or more GPUs may be specialized for executing the machine learning tasks (e.g., clustering, prediction, etc.) discussed above.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
obtaining, by one or more computing devices, contextual information associated with a user and an application on a user device operated by the user, wherein the application comprises a plurality of user interface (UI) elements;
determining, by the one or more computing devices, the user is attempting to complete a first task within the application based on the contextual information and a prediction model, wherein the first task corresponds to a selected cluster of data structures from a plurality of data structures, each of the plurality of data structures referencing identities of corresponding UI elements that were manipulated to complete a task;
obtaining, by the one or more computing devices, a minimum set of UI elements required for the first task that corresponds to the selected cluster of data structures, wherein the minimum set of UI elements is determined by executing a union operation on a first data structure from the selected cluster of data structures corresponding to a first set of UI elements and a second data structure from the selected cluster of data structures corresponding to a second set of UI elements; and
transmitting, by the one or more computing devices, a first custom UI comprising the minimum set of UI elements for the first task to the user device for display to the user.

2. The method of claim 1, further comprising:
transmitting for display a prompt requesting confirmation that the user is attempting to complete the first task;
receiving a response to the prompt; and
updating the prediction model based on the response to the prompt.

3. The method of claim 1, further comprising:
obtaining a minimum set of UI elements required to complete a second task;
generating an image of a second custom UI comprising the minimum set of UI elements required to complete the second task; and
transmitting the image to the user device,
wherein the image is displayed to the user in response to the user selecting an option corresponding to the second task,
wherein the option is displayed with the first custom UI.

4. The method of claim 3, further comprising:
obtaining a first age statistic associated with the first task and a second age statistic associated with the second task,
wherein the prediction model ranks the first task and the second task based on the first age statistic and the second age statistic,
wherein the second task is determined based on the contextual information and the prediction model, and
wherein the first task is ranked higher than the second task.

5. The method of claim 3, further comprising:
obtaining, by the one or more computing devices, the plurality of data structures comprising:
a third data structure identifying a first subset of the plurality of UI elements manipulated by a first user while the first user was completing the first task in the application; and
a fourth data structure identifying a second subset of the plurality of UI elements manipulated by a second user while the second user was completing the second task in the application;
grouping, using a machine learning model executing on the one or more computing devices, the plurality of data structures into a plurality of clusters comprising:
a first cluster corresponding to the first task and comprising the third data structure; and
a second cluster corresponding to the second task and comprising the fourth data structure;
determining the minimum set of UI elements required for the first task based on the first cluster; and
determining the minimum set of UI elements required for the second task based on a subset of the plurality of data structures in the second cluster.

6. The method of claim 5, further comprising:
obtaining a plurality of distances between the plurality of clusters,
wherein generating the image is based on the second cluster being a nearest neighbor of the first cluster.

7. The method of claim 1, wherein the contextual information comprises an application object that has been generated or modified since the user last logged into the application.

8. The method of claim 1, wherein the contextual information comprises a current date and an application object with a date within a range from the current date.

9. A system, comprising:
one or more computer processors;
a memory storing instructions, that when executed by the one or more computer processors, cause the one or more computer processors to:
obtain, contextual information associated with a user and an application on a user device operated by the user, wherein the application comprises a plurality of user interface (UI) elements;
determine the user is attempting to complete a first task within the application based on the contextual information and a prediction model, wherein the first task corresponds to a selected cluster of data structures from a plurality of data structures, each of the plurality of data structures referencing identities of corresponding UI elements that were manipulated to complete a task;

obtain a minimum set of UI elements required for the first task that corresponds to the selected cluster of data structures;

determine the minimum set of UI elements by executing a union operation on a first data structure from the selected cluster of data structures corresponding to a first set of UI elements and a second data structure from the selected cluster of data structures; and transmit a first custom UI comprising the minimum set of UI elements for the first task to the user device for display to the user.

10. The system of claim 9, wherein executing the instructions further cause the one or more computer processors to:

obtain a minimum set of UI elements required to complete a second task;

generate an image of a second custom UI comprising the minimum set of UI elements required to complete the second task; and transmit the image to the user device, wherein the image is displayed to the user in response to the user selecting an option corresponding to the second task, wherein the option is displayed with the first custom UI.

11. The system of claim 10, wherein executing the instructions further cause the one or more computer processors to:

obtain a first age statistic associated with the first task and a second age statistic associated with the second task, wherein the prediction model ranks the first task and the second task based on the first age statistic and the second age statistic, wherein the second task is determined based on the contextual information and the prediction model, and wherein the first task is ranked higher than the second task.

12. The system of claim 10, wherein executing the instructions further cause the one or more computer processors to:

obtain the plurality of data structures comprising:
a third data structure identifying a first subset of the plurality of UI elements manipulated by a first user while the first user was completing the first task in the application; and
a fourth data structure identifying a second subset of the plurality of UI elements manipulated by a second user while the second user was completing the second task in the application;

group, using a machine learning model, the plurality of data structures into a plurality of clusters comprising:
a first cluster corresponding to the first task and comprising the third data structure; and
a second cluster corresponding to the second task and comprising the fourth data structure;

determine the minimum set of UI elements required for the first task based on the first cluster; and determine the minimum set of UI elements required for the second task based on a subset of the plurality of data structures in the second cluster.

13. The system of claim 12, wherein executing the instructions further cause the one or more computer processors to:

obtain a plurality of distances between the plurality of clusters, wherein generating the image is based on the second cluster corresponding to the second task being a nearest neighbor of the first cluster corresponding to the first task.

14. The system of claim 9, wherein the contextual information comprises an application object that has been generated or modified since the user last logged into the application.

15. The system of claim 9, wherein the contextual information comprises a current date and an application object with a date within a range from the current date.

16. A non-transitory computer readable medium (CRM) storing instructions that when executed by one or more computer processors cause the one or more computer processors to:

obtain contextual information associated with a user and an application on a user device operated by the user, wherein the application comprises a plurality of user interface (UI) elements;

determine the user is attempting to complete a first task within the application based on the contextual information and a prediction model, wherein the first task corresponds to a selected cluster of data structures from a plurality of data structures, each of the plurality of data structures referencing identities of corresponding UI elements that were manipulated to complete a task;

obtain a minimum set of UI elements required for the first task that corresponds to the selected cluster of data structures;

determine the minimum set of UI elements by executing a union operation on a first data structure from the selected cluster of data structures corresponding to a first set of UI elements and a second data structure from the selected cluster of data structures corresponding to a second set of UI elements; and transmit a first custom UI comprising the minimum set of UI elements for the first task to the user device for display to the user.

17. The non-transitory CRM of claim 16, wherein the instructions further cause the one or more computer processors to:

obtain a minimum set of UI elements required to complete a second task;

generate an image of a second custom UI comprising the minimum set of UI elements required to complete the second task; and transmit the image to the user device, wherein the image is displayed to the user in response to the user selecting an option corresponding to the second task, wherein the option is displayed with the first custom UI.

18. The non-transitory CRM of claim 17, wherein the instructions further cause the one or more computer processors to:

obtain the plurality of data structures comprising:
a third data structure identifying a first subset of the plurality of UI elements manipulated by a first user while the first user was completing the first task in the application; and
a fourth data structure identifying a second subset of the plurality of UI elements manipulated by a second user while the second user was completing the second task in the application;

group, using a machine learning model, the plurality of data structures into a plurality of clusters comprising:
a first cluster corresponding to the first task and comprising the third data structure; and a second cluster corresponding to the second task and comprising the fourth data structure;

determine the minimum set of UI elements required for the first task based on the first cluster;

determine the minimum set of UI elements required for the second task based on a subset of the plurality of data structures in the second cluster; and obtain a plurality of distances between the plurality of clusters, wherein generating the image is based on the second cluster corresponding to the second task being a nearest neighbor of the first cluster corresponding to the first task.

19. The non-transitory CRM of claim 16, wherein the contextual information comprises an application object that has been generated or modified since the user last logged into the application.

20. The non-transitory CRM of claim 16, wherein the contextual information comprises a current date and an application object with a date within a range from the current date.

* * * * *